United States Patent [19]

Agarwal et al.

[11] Patent Number: 5,066,694

[45] Date of Patent: Nov. 19, 1991

[54] NOVEL PRESSURE SENSITIVE ADHESIVE COMPOSITIONS (C-2511)

[75] Inventors: Pawan K. Agarwal, Bridgewater, N.J.; Thomas Pugel, Riegelsville, Pa.

[73] Assignee: Exxon Research and Engineering Company, Florham Park, N.J.

[21] Appl. No.: 589,296

[22] Filed: Sep. 27, 1990

Related U.S. Application Data

[63] Continuation-in-part of Ser. No. 491,403, Mar. 9, 1990, abandoned, which is a continuation of Ser. No. 287,421, Dec. 21, 1988, abandoned.

[51] Int. Cl.$^5$ .................. C08L 95/00; C08K 5/09
[52] U.S. Cl. ........................ 524/60; 524/66; 524/300; 524/322; 524/394; 524/399; 524/400
[58] Field of Search ................ 524/60, 66, 300, 322, 524/394, 399, 400

[56] References Cited

U.S. PATENT DOCUMENTS 4,387,172  6/1983  Agarwal et al. .................. 524/66
4,387,174  6/1983  Lundberg et al. ................. 524/66

Primary Examiner—Joseph L. Schofer
Assistant Examiner—R. H. Delmendo
Attorney, Agent, or Firm—R. E. Nanfeldt; J. J. Dvorak

[57] ABSTRACT

This invention relates to a pressure sensitive adhesive compositions which include an emulsion of a metal neutralized sulfonated copolymer of isoprene/sodium styrene sulfonate, wherein the neutralized sulfonated copolymer has about 5 to about 250 meq. of neutralized sulfonate groups per 100 grams of the neutralized sulfonated copolymer, and less than about 50 parts by weight of an emulsion of a preferential polar plasticizer, and less than about 300 parts by weight of an emulsion of a hydrocarbon tackifying resin of a petroleum or coal tar distillate, having about 4 to 12 carbon atoms, wherein the hydrocarbon resin is composed of aliphatic dienes and monoolefins per 100 parts by weight of the neutralized sulfonated copolymer.

5 Claims, No Drawings

NOVEL PRESSURE SENSITIVE ADHESIVE COMPOSITIONS (C-2511)

BACKGROUND OF THE INVENTION

This invention relates to pressure sensitive adhesive compositions which include a copolymer of isoprene and a sulfonate monomer prepared by emulsion polymerization process and about 25 to 300 parts by weight of a hydrocarbon resin of a petroleum or coal tar distillate, aliphatic dienes and mono-and diolefins, cyclic olefins of 5 or 6 carbon atoms and hydrogenated polycyclics per 100 parts by weight of the sulfonated copolymer and about,.5 to about 50 parts by weight of a preferential polar plasticizer such as zinc stearate per 100 parts by weight of the sulfonated copolymer.

Conventional high strength adhesives commonly used in the pressure sensitive adhesive industry are prepared by solvent based techniques. For example, block copolymers based on polystyrene and isoprene, can be dissolved in a suitable solvent containing a hydrocarbon resin tackifier, which upon casting on a variety of substrates yield materials having outstanding adhesive properties. These materials can exhibit tack properties of 2-5 lbs. per inch (180° peel test) and yet retain their tack under load over long periods of time. These properties are normally attributed to systems that display a combination of appropriate polymer modulus coupled with extremely high molecular weight or a suitable network that is induced in the resulting polymer system. These materials have achieved great prominence in the adhesive industry.

Despite the success of solvent based adhesives there is a current need by the adhesive industry to employ either hot melt of water based adhesive candidates. The reasons for the trend to water based PSA's is that the environmental and toxicity restrictions imposed by federal, state, and local governments markedly restrict the use of effective solvents. In addition, the low polymer content in such solvent based adhesives can present a financial liability, when employed on a large scale. As a result of these factors, it is highly desirable that PSA's having similar properties to those achievable from solvent based systems be obtained from water based systems. Unfortunately, there has not been a significant amount of success in achieving the PSA properties from a water based polymer system that can equal the properties that one needs from a solvent based PSA. The reasons for that deficiency of the properties of water based PSA's are several: A water based PSA based on a conventional hydrocarbon monomer provides a hydrophobic polymer system contained in an aqueous matrix. The fusion or drying of a water based PSA system with all its incumbent surfactants and other additives to stabilize the emulsions adversely affect the adhesive performance in such systems. Consequently, the commonly emulsified water based PSA's are deficient in their adhesive character and their long-term creep resistance (cohesive strength). An urgent need exists for materials which will fill this void.

The use of hot melt adhesives has also been growing very rapidly in the adhesive industry, particularly for packaging application. The hot melt adhesives are generally applied (as the name implies) by conventional extrusion or coating techniques in the temperature range of 250 to 450° F. on one of the surfaces to be bonded. The other surface is brought in contact with the hot surface for a sufficient period of time for the melt to cool, whereupon solidification a strong and durable bond is formed.

The key requirements of resins suitable for hot melt adhesive applications are that they should have good physical properties, e.g., tensile strength, etc., at ambient conditions, and they can flow easily at fabrication temperatures and they must have sufficiently good compatibility that they do not phase separate on storage or during subsequent use. The ethylene vinyl acetate (EVA) copolymers and styrene block copolymers, such as Kraton, have been extensively used as hot melt adhesives; however, their use has been limited largely to pressure sensitive adhesives.

There is a significant demand in the marketplace today for polymer systems which exhibit good green strength or tensile properties at ambient temperatures which, when heated to a predetermined temperature, will give good flow such that they may be applied to a coating or substrate by melt extrusion or other suitable techniques. Alternatively, the system could be waterborne. That is, the entire adhesive package be in the form of an emulsion which after appropriate coating on a substrate provide good green strength. Such a system should also be easy in its flow characteristics during coating and fusion steps. It is desired from such adhesives that they be easier to handle, if needed to be transferred from one substrate to the other for transfer tape applications. In the past it has been common to employ organic solutions as a way of applying a coating of a polymer system which is designed to have good adhesive properties. As mentioned earlier, this practice is now under considerable pressure, due to the fact that the organic solvents must be evaporated from the coating giving rise to pollution

PRIOR ART

Several U.S. patents have described sulfonated polymers such as sulfonated butyl and sulfonated EPDM in adhesive applications (e.g., U.S. Pat. No. 3,867,247 and U.S. Pat. No. 3,801,531). Moreover, previous inventions (e.g. U.S. Pat. No. 4,387,172) have described copolymers of isoprene or styrene and butadiene with a sulfonate monomer that gives rise to very stable emulsions at high solids content. The blending of these sulfonate copolymers with suitable resin emulsions followed by evaporation and fusion gives rise to clear, strong PSA candidates that can have good tack. These earlier inventions have shown that either aggressive tack or high cohesive strength can readily be achieved by these materials. However, until now, the combination of good tack and high cohesive strength in a single formulation has not been achievable. The reasons for the lack of success of achievement of the combination of these characteristics has not been apparent. The lack of tack combined with high cohesive strength however, does not preclude commercialization of such systems.

It has now been discovered that by suitably controlling the molecular weight of the sulfonate/isoprene copolymer and the level of sulfonate monomer and by incorporating a preferential polar plasterized such as zinc stearate, particularly in the form of an emulsion, adhesive system having a desired range of adhesive and cohesive properties are achieved.

Before describing the examples and results, it is important to distinguish the instant invention over those prior art systems. The former patent (U.S. Pat. No. 3,867,247) is directed at a sulfonated butyl cement which is solvent based and is employed to laminate various substrates. It is important to note that the instant invention differs dramatically from that patent as follows:

(a) The instant invention is directed at sulfonated co- or terpolymers formed by a copolymerization process whereas most of the prior art deals with sulfonated butyl rubber (e.g., U.S. Pat. No. 3,867,247) which was formed by sulfonation of the butyl rubber.

(b) The instant invention contains an emulsified preferential plasticizer capable of associating with the metal sulfonate groups and thereby reducing the melt flow viscosity of the resulting adhesive at fusion temperatures and thereby promotes the uniformity of the coating as well.

(c) The polymers used in the instant invention are chemically different (due to plasticizer interactions) from those of the patents above giving rise to different properties and compatibilities.

(d) Previous patent by Agarwal et al. such as U.S. Pat. No. 4,483,960, 4,517,250; U.S. Pat. No. 4,387,172, 4,387,174 and U.S. Pat. No. 3,801,531, individually or in conjunction with each other does not remotely imply or teach such compositions.

SUMMARY OF THE INVENTION

This invention relates to pressure sensitive adhesive compositions which include an emulsion of a metal of oramine neutralized sulfonated copolymer of a conjugated diene and sodium styrene sulfonate prepared by an emulsion polymerization process which has about 5 to about 250 meq. of neutralized sulfonate groups per 100 grams of the neutralized sulfonated copolymer more preferably 10 to 200 meq, and most preferably 25 to 100 meq, and less than about 300 parts by weight of an emulsion of a hydrocarbon tackifying resin of a petroleum or coal tar distillate, having about 5 to about 6 carbon atoms, said hydrocarbon resin having aliphatic dienes and monoolefins therein per 100 parts by weight of the metal neutralized sulfonated elastomeric copolymer and about 1 to 75 parts of an emulsified preferential plasticizer per 100 parts of the metal neutralized sulfonated elastomeric co or terpolymer is added to the composition.

GENERAL DESCRIPTION

The present invention relates to unique and novel pressure sensitive adhesive compositions which comprise a mixture of an emulsion of a metal neutralized sulfonated copolymer of a conjugated diene and sodium styrene sulfonate prepared by an emulsion polymerization process and an emulsion of a hydrocarbon resin, wherein to the compositions is added an emulsified form of an ionic preferential plasticizer.

A. SULFONATE POLYMER AND PROCESS FOR FORMING

The solid copolymer of the instant invention comprise at least 80% by weight of at least one conjugated diene having from 4 to 12 carbon atoms or at least 80% by weight of a combination of at least one conjugated diene and styrene, wherein the combination contains less than 50 weight percent of styrene of the total 80 weight percent and a minor proportion of a metal or amine neutralized sulfonate monomer characterized by the formula:

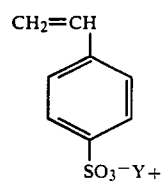

wherein Y is a cation selected from Groups IA, IIA, IB and IIB of the Periodic Table or an amine of the formula:

where $R_1$ and $R_2$ can be aliphatic groups of $C_1$ to $C_{12}$ or hydrogen. The copolymer is water insoluble having at least 0.2 weight percent sulfur to less than about 7 weight percent sulfur chemically combined.

The instant invention relates to the formation of emulsions of sulfonate containing copolymers which are formed by a free radical copolymerization process. The monomers used in the free radical emulsion copolymerization processes are conjugated dienes which are copolymerized with sulfonate containing monomers.

In general, the conjugated diene and sulfonate containing monomer are dispersed in a water phase in the presence of a water soluble initiator or a redox system which has one component soluble in the oil phase and one component soluble in the water phase, and either with or without surfactant, wherein the temperature is sufficient to initiate polymerization. To the resultant latex is added a tackifier resin and the emulsion is doctor bladed onto a substrate and dried at room or elevated temperatures to form the adhesive film.

The copolymers formed from the free radical emulsion copolymerization process of the instant invention can be generally described as having an Mn as measured by GPC of about 5000 to about 400,000, more preferably about 10,000 to about 200,000. The copolymers of the instant invention contain about 0.2 to about 7 weight percent of the chemically combined sulfur, more preferably about 0.3 to about 6, and most preferably about 0.5 to about 5 weight percent sulfur. The copolymers of the instant invention are water insoluble, substantially gel free, thermally stable and oxidatively stable. Typical, but nonlimiting examples of the copolymers which can be formed by the instant free radical emulsion copolymerization process are: butadiene/sodium styrene sulfonate copolymer, isoprene/sodium styrene sulfonate copolymer, butadiene/sodium vinyl sulfonate copolymer, isoprene/sodium vinyl sulfonate copolymer. Obviously, a large number of copolymers and even terpolymers can be formed by the instant free radical copolymerization process. Typically, the copolymerization of any conjugated diene as so defined herein can be readily copolymerized with any sulfonate containing monomer as is defined herein.

B. CONJUGATED DIENES

The conjugated dienes of the instant invention are generally defined as acyclic conjugated dienes containing from about 4 to about 10 carbon atoms more preferably about 4 to about 6 carbon atoms. Typical, but non-limiting examples of acyclic conjugated dienes are 1,3-butadiene, isoprene (2-methyl-1,3-butadiene), 2,3-dimethyl 1,3-pentadiene, 2-methyl-1,2-pentadiene, 2,3-dimethyl-1,3-pentadiene, 3-methyl-1,3-pentadiene, 2-phenyl butadiene and chloroprene. Typical, but non-limiting examples of cyclic conjugated dienes are cyclopentadiene and methyl cyclopentadiene. The preferred conjugated dienes of the instant invention are selected from the group consisting of 1,3-butadiene, isoprene and chloroprene. In the formation of the sulfonate containing copolymer, one copolymerizes one of the aforementioned conjugated dienes with the sulfonate containing monomer. Sulfonate containing terpolymers can be readily formed by copolymerizing the sulfonate containing monomer with a mixture of two of the above identified conjugated dienes.

Alternately, other co or terpolymers of vinyl monomers such alkyl acrylates or methacrylates, or alkyl acrylate amides having about 4 to about 12 carbon atoms could be copolymerized with sulfonate containing monomers.

C. SULFONATE CONTAINING MONOMERS

The sulfonate containing monomers of the instant invention which are water soluble can be generally described as a monomer having unsaturation and a metal or amine sulfonate group. The metal or amine neutralized sulfonate monomer is characterized by the formula:

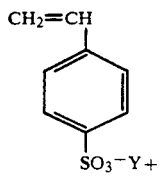

wherein Y is a cation selected from Groups IA, IIA, IB and IIB of the Periodic Table of an amine of the formula:

where $R_1$ and $R_2$ can be aliphatic groups of $C_1$ to $C_{12}$ or hydrogen. Particularly suitable metal cations are sodium, potassium, and zinc, and an especially preferred metal cation is sodium.

An especially preferred sulfonate containing monomer is metal sulfonate styrene. The molar ratio of sulfonate containing monomer to conjugated diene is about 1/200 to about 1/5, more preferably about 1/150 to about 1/3, and most preferably about 1/100 to about 1/1. Either a water soluble, free radical initiator such as potassium persulfate, ammonium persulfate, water soluble redox couples such as potassium persulfate, sodium metabisulfite or oil soluble, water soluble redox couples such as diisopropyl benzene hydroperoxide, triethylenetetramine are effective in initiating these copolymerizations. The water soluble inorganic systems are preferred because of an apparent reduction of side reactions with the resulting unsaturated polymer.

The surfactants employed for this invention are varied and well known in the art. The typical emulsifiers or surfactants can be employed, however, some are more effective than others in generating latexes of better stability. A preferred is sodium lauryl sulfate. This copolymerization can also be conducted without emulsifer because of the surfactancy of the sulfonate monomer.

Buffering agents can be employed in the instant polymerization process and are selected from the group consisting of sodium carbonate, ammonia, sodium acetate, trisodium phosphate etc. When utilized, these buffering agents are employed at a concentration of about 0.1 to about 5 grams/100 grams water employed in the emulsion system.

Chain transfer agents can be readily employed in the instant polymerization process for controlling the molecular weight of the resultant copolymer. The concentration of chain transfer agent is from 0 to about 1.0 grams/100 grams of the combined weight of the sulfonate containing monomer and the conjugated diene.

The free radical emulsion copolymerization of the water soluble sulfonate containing polymer and the conjugated diene yields a stable latex, wherein the resultant water insoluble co or terpolymer is not covalently crosslinked and possesses substantial ionic crosslinking, and has about 0.2 to about 7 weight percent of chemically combined sulfur, more preferably about 0.3 to about 6. To the resultant latex is added the tackifier resin to form the emulsion type adhesive composition.

D. COMMERCIAL TACKIFIER RESINS

To the emulsion of the metal neutralized sulfonated elastomeric co or terpolymer is added an emulsion of a commercial tackifying resin which has a softening point of about 0 to about 160° C., more preferably about 10 to about 140° C. and most preferably about 20 to 120° C. A variety of commercial tackifier resins are available. Some of these resins contain and/or pinene base and/or pire base polyterpene resins as the main ingredient, while other are derived from the polymerization of petroleum or coal distillates which consist of aliphatic dienes, mono and diolefins and cyclic olefins having about 5 to about 6 carbon atoms. The latter type of tackifiers have primarily piperyline and/or isoprene structure. A general but excellent description of tackifying resins derived from petroleum derivatives can be found in, for example, *Encyclopedia of Polymer Science and Technology*, Vol. 9, pages 853 to 860, chapter by John Findlay, published by John Wiley & Sons NY (1968).

Typical but non-limiting tradenames of these commercial tackifiers are Wingtack of Goodyear, Escorez of Exxon, Piccolyte of Hercules and Zonarez of Arizona Chemicals. Recently, these and various other companies have also started marketing relatively higher softening point resins. These are generally modified aliphatic hydrocarbon resins and/or hydrogenated polycyclics. The physical appearance of these commercial tackifying resins varies, depending upon their softening point, they can be either viscous liquids or light-colored solids at room temperature. Most often, their initial color (Gardner) is about 1.0 to about 7.0 and the density from about 0.7 to 1.0 gm/cm$^3$ at room temperature. The acid number of these resins is usually less than 1. In general, the molecular weight of these commercial tackifying resins is not homogeneous, the number average molecular weight Mn, as measured by GPC, can be from about 300 to about 5000, and more preferably about 400 to about 4000 and most preferably about 500 to 2000.

As well-known to those familiar with the use of tackifying resins, because of their wide range compatibility, any of them can be used with sulfonated polymers in proper formulation, which will yield adhesive systems of varying physical characteristics. To cite an example in the present invention, the tackifying resins used are those based on hydrocarbon resins.

These hydrocarbon tackifier resins are incorporated into the emulsion type adhesive composition at about 25 to about 700 parts by weight per 100 parts by weight of the metal neutralized sulfonated copolymer, more preferably about 30 to about 500, and most preferably about 50 to about 300.

E. METHOD OF FORMING BLEND ADHESIVE COMPOSITIONS

In forming the emulsion type adhesive composition of the metal neutralized sulfonated elastomeric copolymer, first the preferential polar plasticizer such as zinc stearate in the form of an emulsion is added to an emulsion of the sulfonated copolymer. The preparation of such an emulsion is disclosed in one of the following examples. An emulsion of a hydrocarbon tackifying resin is then added to this mixture of emulsions of metal neutralized sulfonated elastomeric copolymer and preferential plasticizer. The tackifying resin should be readily dissolved in a hydrocarbon solvent such as toluene at a concentration level of about 1 to about 30 grams per 100 ml of solvent, for example 10 grams. The solution of tackifier resin is added to the emulsion mixture of the metal neutralized sulfonated copolymer and preferential plasticizer and vigorously mixed to form the emulsion type adhesive composition. Alternatively, the tackifier emulsion of desired amount could be added to the mixture. Various tackifying resins in the emulsion form are now commercially available.

F. PREFERENTIAL PLASTICIZERS

An emulsion of a preferential (ionic) plasticizer can be added to the emulsion of the copolymer of the conjugated diene and the neutralized styrene sulfonate and the emulsion of hydrocarbon tackifying resin.

The preferential plasticizer is selected from the group consisting of carboxylic acids having about 5 to about 30 carbon atoms, more preferably about 8 to about 22 carbon atoms, or basic salts of these carboxylic acids, wherein the metal ion of the basic salt is selected from the group consisting of aluminum, ammonium, lead and Groups IA, IIA, IB and IIB of the Periodic Table of Elements and mixtures thereof. The carboxylic acids are selected from the group consisting of lauric, myristic, palmitic, or stearic acids and mixtures thereof; e.g., zinc stearate, magnesium stearate or zinc laurate.

The preferential plasticizer is incorporated into the adhesive composition at about 1 to about 75 parts by weight based on 100 parts by weight of the copolymer, more preferably at about 7 to about 50, and most preferably at about 10 to about 30. Alternatively, other preferential plasticizers are selected from amines, amides such as stearamide, ammonium and amine salts of carboxylic acids and mixtures thereof. The preferred plasticizers are selected from carboxylic acids having about 8 to about 22 carbon atoms or metallic salts of these carboxylic acids and mixtures thereof.

It is critical that the preferential plasticizer being in the form of an emulsion of preferential plasticizer is added to the emulsion of the copolymer and hydrocarbon tackifying resin. If one attempts to add solid preferential plasticizer to the emulsion of copolymer and hydrocarbon tackifying hydrocarbon resin the systems collapses due to the aggregation of the plasticizer and one obtains what can only be literally described as a goo or muck. Obviously, this system is not useful as a pressure sensitive adhesive and in fact, one will see an actual decrease in adhesive properties as compared to an emulsion of just the copolymer and hydrocarbon tackifying resin.

METHOD OF APPLICATION

The emulsion of the metal neutralized sulfonate/diene copolymer, preferential plasticizer and the hydrocarbon tackifying resin is doctor bladed to the required thickness onto a substrate and the formed adhesive film is dried at room temperature or elevated temperature either under vacuum or at atmospheric pressure for a sufficient period of time in order to remove the water from the adhesive film.

DETAILED DESCRIPTION OF THE PREFERRED EMBODIMENTS

A series of emulsion type adhesive composition were prepared. In the following examples, various final adhesive compositions and their properties are described. In example 1, the synthesis procedure of an isoprene sodium styrene sulfonate copolymer is disclosed.

EXAMPLE 1

Emulsion Copolymerization of Isoprene and Sodium-Styrene Sulfonate

In a one gallon stainless steel pressure vessel the following ingredients were charged isoprene 1020 gms and a blend of 1500 gm of distilled, deionized and dearated water with 90 grams of sodium styrene sulfonate, 68 grams of sodium lauryl sulfate and 24 gms of dodecylthiol. The vessel was closed and purged with dry nitrogen. Later the mixing was started and the reactor temperature was set at 45° C. To initiate the reaction, 3.75 gms of potassium persulfate dissolved in 50 ml was injected into the vessel.

After three hours reaction time, the reaction was stopped by discharging the reactor contents into a container which contained 1.5 gms of hydroquinone and 150 ml water. The emulsion in this example was identified as sample 163-A.

COPOLYMER WORK-UP

About half of the emulsion in 4.0 gallon of methanol was precipitated. 285 grams of NaCL was dissolved in 1200 ml water and add it to the methanol-emulsion blend (to coagulate the emulsion). The blend was stirred with a large spatula and the coagulated copolymer was washed with water several times, to extract the NaCL. The polymer was blended in a "Waring Blender" in fresh methanol (containing 1.0 gram of BHT stabilizer), for one half minute at high speed. The polymer was vacuum filtered and dried in a vacuum oven for 24 hours at 250° C.

---

Total weight of copolymer: 750 grams (~74% conversion)
Analytical results: Sulfur: 1.00 wt. %
    Sodium: 0.40 wt. %
(0.40 wt. % sodium is equivalent to about 1.0 mole %
NaSS in the copolymer).

EXAMPLE 2

Preparation of Emulsion of the Preferential Polar Plasticizing Zinc Stearate The emulsion of preferential polar plasticizer such as zinc-stearate in water was prepared by the following technique. About 5 to 7 gms of a commercial grade zinc stearate powder was added in a 250 ml. erlenmeyer flask containing short 150 ml. of deionized water. The contents were stirred in a magnetic stirrer and during stirring short 20 to 30 drops of one nonionic surfactant Igipal Co-630, were added dropwise. The stirring was continued overnight. It was found that if the stirring is stopped, after few hours some of the zinc-stearate or the stearic acid tend to settle; however not if it remains in the suspended form. It is recommended that agitation should continue till use or the settled material be removed and proper solids contents of the emulsion be determined. In general, however, reasonably stable emulsions containing less than 10% solids can be obtained by this easy and straight forward manner.

EXAMPLE 3

Preparation of Emulsion of Isoprene-sodium styrene sulfonate copolymer containing both the preferential plasticized emulsion and tackifying resins (Escorez 1310) emulsion Adhesive blend emulsion compositions were prepared by mixing the appropriate quantities of emulsions of copolymers, the plasticized emulsion and resin emulsions. As an example in order to make an adhesive composition containing 50 parts of the copolymer, 40 parts of the resin and 5 parts of the plasticizer, the following quantities of the respective emulsions were used.

| copolymer emulsion- | 60 ml. containing about 38.8% by weight the solids |
| --- | --- |
| Resin emulsion- (Escorez 1310) | 31 ml. containing about 60% by weight the solids |
| Plasticizer emulsion- | 24 ml. containing about 5% by weight the solids |

The blend emulsion was agitated in order to ensure homogeneous mixing. Although it is not crucial the order in which these three ingredients are mixed, but it is preferred that copolymer and plasticizer emulsion are first mixed and followed by the resin emulsion. The resulting new stable emulsion was then evaluated as described in the following examples.

EXAMPLES 4 to 12

Desired quantities of emulsions prepared from the above techniques were cast on a 1.5 ml thick mylar film using an adhesive draw-down blade. Wet adhesive film thickness was experimental, determined such that the adhesive film when dried, was 1.0–1.5 mil thick. The adhesive film was dried and the resin polymer and isoprene NaSS copolymer blend fused by exposure to various temperatures and time periods. Most often, however the drying conditions was 100° C. for two minutes. Appropriate test specimens were then prepared and standard pressure sensitive adhesive tests were run. Illustrative data are shown in Table I.

TABLE I
PSA ADHESIVE COMPOSITIONS BASED ON ISOPRENE Na STYRENE SULFONATE COPOLYMERS-FORMULATED ADHESIVE PROPERTIES

| Example # | Composition | Film Thickness[1] (mils) | Rolling Ball Tack, cm | 180° Peel Strength, ppi | 90° Quick Stick, ppi | Polyken Tack, gm | 178° Hold to Steel, hrs. |
| --- | --- | --- | --- | --- | --- | --- | --- |
| 4 | Copolymer/Resin (50/50)[2] | 1.0 | 16.6 | 1.6 | 0.8 | 414 | 1.1 |
| 5 | Copolymer/Plasticizer (95/5) | 0.8 | 30+ | <0.05 | 0.15 | — | — |
| 6 | Copolymer/Plasticizer/Resin (50/5/50) | 1.0 | 30+ | 0.43 | 0.45 | 118 | 7.0 |
| 7 | Copolymer/Plasticizer (90/10) | 0.7–1.2 | 30+ | <0.05 | 0.05 | — | — |
| 8 | Copolymer/Plasticizer/Resin (50/10/50) | 1.0 | 30+ | 0.9 | 0.45 | 210 | 0.4 |
| 9 | Copolymer/Plasticizer/Resin (40/10/50) | 0.3–1.0 | 30+ | 1.5 | 0.65 | 181 | 4.7 |
| 10 | Copolymer/Plasticizer/Resin (30/10/70) | 1.5 | 30+ | (T)[3] | (T)[3] | 146 | 42.7 |
| 11 | Copolymer/Plasticizer/Resin (60/5/40) | 0.5–1.0 | 30+ | 0.48 | 0.2 | 219 | 21.0 |
| 12 | Copolymer/Plasticizer/Resin (40/5/60) | 1.0 | 30+ | 2.1 | (T)[3] | 422 | 21.7 |

[1]Fusion temperature 100° C., time 2 minutes.
[2]Dry basis by weight (Resin-Escorez 1310 emulsion of Exxon Chemicals U.S.A.)
[3]T indicates tracking observed in the films-data not taken.

EXAMPLE 13

It is clear from the data presented in Table III that there are significant differences in the various samples. Since in all adhesive blends a common tackifying resin Escorez-1310 and a common ISS Copolymer was used, the differences can readily be attributed to the incorporation of the preferential plasticized emulsion. Note Example 4 does not contain the plasticizer while Examples 5 thru 12 contain the emulsified polar plasticizer. The differences in the adhesive properties are evident from the data presented in columns 2 thru 7 of Table I.

EXAMPLE 14

An adhesive composition of an emulsion of the sulfonated copolymer of Example 1, the hydrocarbon tackifying resin of Example 3 and a solid bulk preferential plasticizer of zinc stearate was prepared as follows. To a blend of 60 ml of sulfonated copolymer emulsion (38.8% solids by weight) and 31 ml of an emulsion of hydrocarbon tackifying resin (Escorez 1310; 60% by weight of solids) was added at room temperature and at 50° C. 1.2 grams of solid zinc stearate. In both cases there was an aggregation of the zinc stearate which failed to uniformly mix into the blend emulsion of the sulfonated copolymer and Escorez 1310. Both samples were cast onto 1.5 ml thick mylar film according to the procedure of example 4 to an adhesive layer thickness 1.5 ml. The film was dried and fused according to the procedure of Example 4.

TABLE II

| Sample | Film Thickness mls. | Rolling Ball Tack | 180° Peel Strength | 90° Quick Stick | Polyken Test | 178° Hold to Steel Hrs. |
|---|---|---|---|---|---|---|
| 14-1 | 1.5 | 30+ | <0.05 | 0.01 | 86 | 0.25 |
| 14-2 | 1.5 | 30+ | <0.10 | 0.03 | 43 | 0.13 |

What is claimed is:

1. A pressure sensitive adhesive emulsion system which comprises:
   (a) an emulsion of a metal or amine neutralized sulfonated copolymer of a conjugated diene of from 4 to 12 carbon atoms and styrene sulfonate, said metal or amine neutralized sulfonated copolymer having a out 5 to about 250 meq. of neutralized sulfonated groups per 100 grams of said neutralized sulfonated copolymer, wherein aid neutralized sulfonated copolymer has at least 80% by weight of said conjugated diene;
   (b) about 1 to about 75 parts by weight (dry basis) of an emulsion of a preferential plasticizer per 100 parts by weight of the neutralized sulfonated copolymer, the plasticizer being selected from the group consisting of a fatty acid or a metal salt of a fatty acid, wherein said fatty acid has about 5 to about 30 carbon atoms and the metal cation is selected from the group consisting of Groups IA, IIA, IB and IIB of the Periodic Table of the Elements; and
   (c) about 25 to about 300 parts by weight (dry basis) of an emulsion of a hydrocarbon tackifying resin based on a petroleum or coal tar distillate over 100 parts by weight of said neutralized sulfonated copolymer.

2. A pressure sensitive adhesive emulsion according to claim 1 wherein said conjugated diene is isoprene.

3. A pressure sensitive adhesive emulsion according to claim 1, wherein said sulfonated groups are neutralized with a metal cation selected from the group consisting of Groups IA, IIA, IB and IIB of the Periodic Table of Elements.

4. A pressure sensitive adhesive emulsion system of claim 1, wherein the preferential plasticizer is incorporated in the adhesive composition at from about 7 to about 50 parts by weight of the copolymer.

5. A pressure sensitive adhesive emulsion system of claim 4, wherein the preferential plasticizer is selected from the group consisting of carboxylic acids having from about 8 to 22 carbon atoms, metal salts of these carboxylic acids and mixtures thereof.

* * * * *